United States Patent
Wu

[11] Patent Number: 5,993,026
[45] Date of Patent: Nov. 30, 1999

[54] PEN-BASE LASER POINTER

[76] Inventor: Jen Chih Wu, 29-1, Alley 19, Lane 263, Lo Li Third Street, An Lo Dist., Keelung, Taiwan

[21] Appl. No.: 09/086,673

[22] Filed: May 29, 1998

[51] Int. Cl.[6] ........................................................ F21S 9/02
[52] U.S. Cl. .............................................. 362/259; 362/118
[58] Field of Search ...................................... 362/109, 259, 362/118

[56] References Cited

U.S. PATENT DOCUMENTS

| | | | |
|---|---|---|---|
| 5,343,376 | 8/1994 | Huang | 362/259 |
| 5,473,464 | 12/1995 | Knowles et al. | 362/118 X |
| 5,617,304 | 4/1997 | Huang | 362/259 X |
| 5,663,828 | 9/1997 | Knowles et al. | 362/118 X |
| 5,697,700 | 12/1997 | Huang | 362/259 |
| 5,897,200 | 4/1999 | Ho | 362/259 |

*Primary Examiner*—Laura K. Tso
*Attorney, Agent, or Firm*—Smith, Gambrell & Russell

[57] ABSTRACT

A pen-base laser pointer includes a metal barrel, a laser firing cap and a metal bottom cap fastened to front and rear ends of the metal barrel, a laser module and battery cells mounted inside the metal barrel, and an on/off button controlled to close/open the circuit of the laser module, wherein the laser module has a metal contact spring plate disposed in contact with the inside wall of the metal barrel, the metal contact spring plate having a plurality of radial projecting portions equiangularly spaced around the border thereof, which are deformed and pressed against the inside wall of the metal barrel to hold down the laser module in place when the laser module is inserted into the metal barrel.

3 Claims, 4 Drawing Sheets

PEN-BASE LASER POINTER

BACKGROUND OF THE INVENTION

The present invention relates to a pen-base laser pointer, and more particularly to such a pen-base laser pointer in which a metal contact spring plate of the laser module of the laser pointer is deformed and pressed against the inside wall of the metal barrel of the laser pointer to hold down the laser module in place when the laser module is inserted into the metal barrel.

A variety of pen-base laser pointers have been disclosed, and have appeared on the market. These pen-base pointers are commonly comprised of a barrel, a battery set, a laser module, a lens holder, and an on/off button. The lens holder and the laser module may be made in integrity. According to conventional designs, when the laser module is inserted into the barrel, it is difficult to accurately secure the laser module in positive. If the laser module is not accurately set into position, the on/off button and the switch on the laser module will not be aligned. Further, when the laser module is installed, it may be easily forced to displace. In order to secure the laser module firmly in place, particular retaining means is required.

SUMMARY OF THE INVENTION

According to one aspect of the present invention, the pen-base laser pointer comprises a metal barrel, a laser firing cap and a metal bottom cap fastened to front and rear ends of the metal barrel, a laser module and battery cells mounted inside the metal barrel, and an on/off button controlled to close/open the circuit of the laser module, wherein the laser module has a metal contact spring plate disposed in contact with the inside wall of the metal barrel, the metal contact spring plate having a plurality of radial projecting portions equiangularly spaced around the border thereof, which are deformed and pressed against the inside wall of the metal barrel to hold down the laser module in place when the laser module is inserted into the metal barrel. According to another aspect of the present invention, the on/off button is fixedly supported on a rubber cushion adhered to the laser module, and partially projecting out of a side hole on the metal barrel. According to still another aspect of the present invention, an electrically insulative cushion ring is supported between the battery cell and the metal bottom cap around the positive terminal of the battery cells. If the battery cells are reversely installed, they are stopped from contacting the metal bottom cap by the electrically insulative cushion ring.

DETAILED DESCRIPTION OF THE PREFERRED EMBODIMENT

Figure 1:
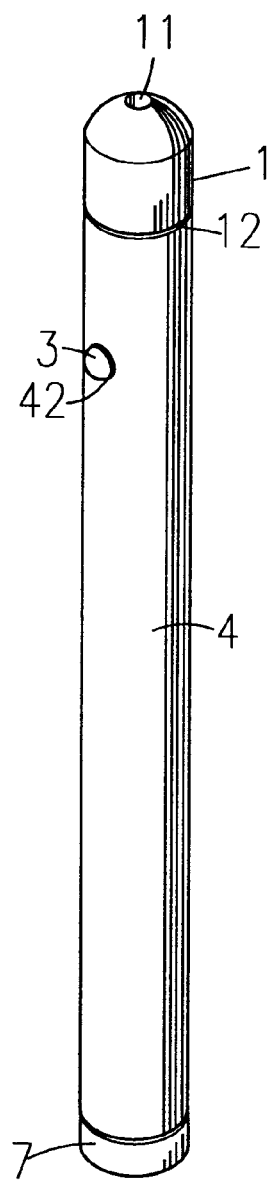
FIG. 1 is a perspective view of a pen-base laser pointer according to the present invention.
Figure 2:
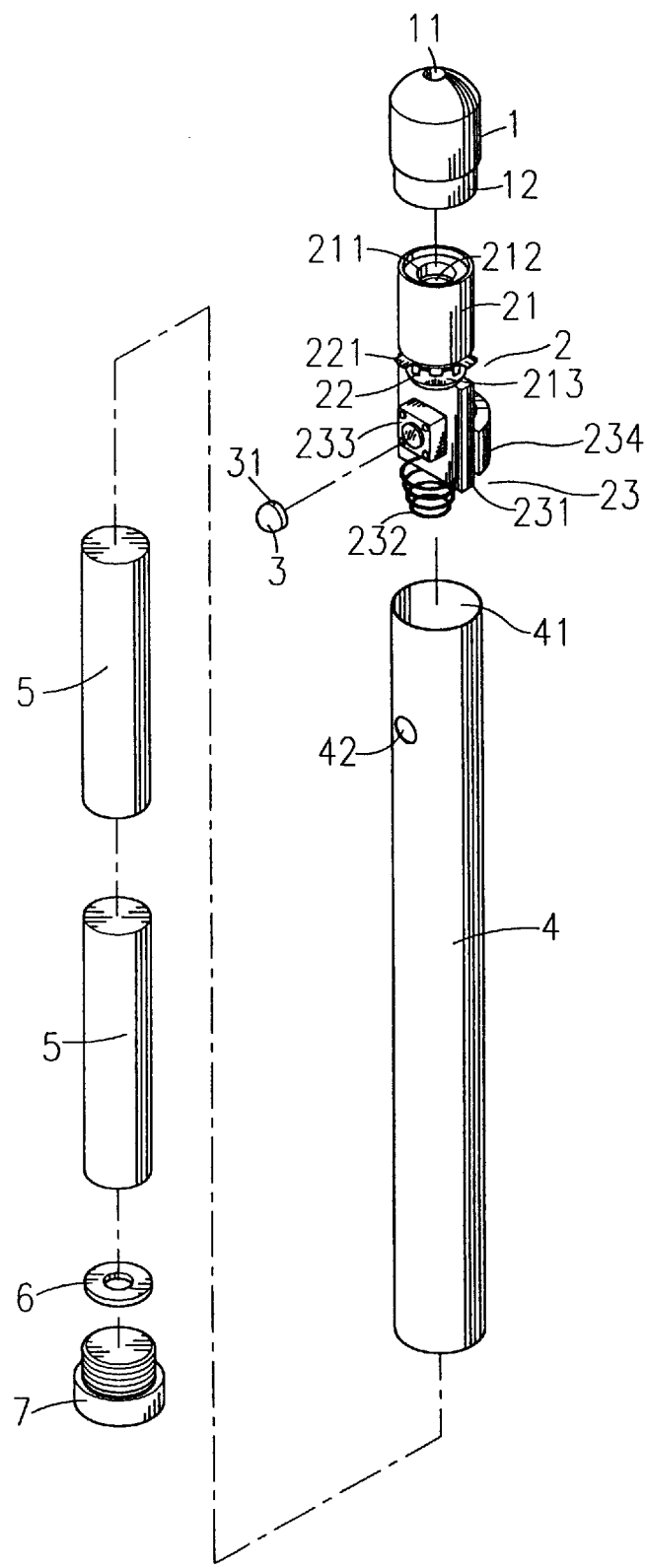
FIG. 2 is an exploded view of the pen-base laser pointer shown in FIG. 1.
Figure 3:
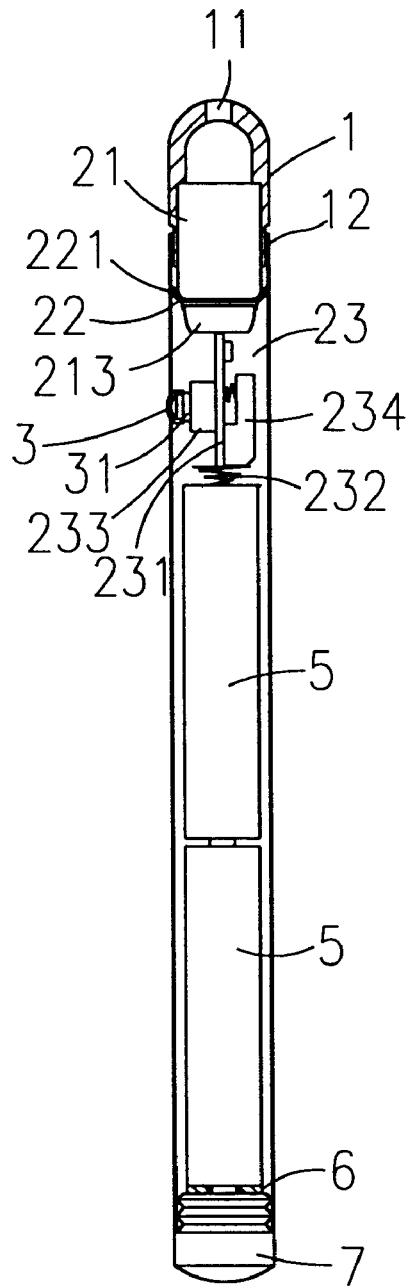
FIG. 3 is a longitudinal view in section of the pen-base laser pointer shown in FIG. 1.

Referring to FIGS. 1, 2 and 3, a pen-base laser pointer in accordance with the present invention is generally comprised of a front cap 1, a laser module 2, a button 3, a metal barrel 4, battery cells 5, an electrically insulative cushion ring 6, and a metal bottom cap 7.

The metal barrel 4 has a longitudinal center through hole 41, which receives the laser module 2 and the battery cells 5, and a side hole 42, which receives the button 3. The metal bottom cap 7 is fastened to one end namely the rear end of the metal barrel 4 by a screw joint. The front cap 1 is fastened to the other end namely the front end of the metal barrel 4. The front cap 1 has a coupling neck 12 at one end plugged into the front end of the metal barrel 1., and a laser firing hole 11 at the center. The battery cells 5 are connected in series, and supported on the electrically insulative cushion ring 6 above the metal bottom cap 7. The positive terminal of the series of battery cells 5 is disposed in contact with the metal bottom cap 7. The negative terminal of the series of battery cells S is disposed in contact with one end of the laser module 2.

Figure 4:
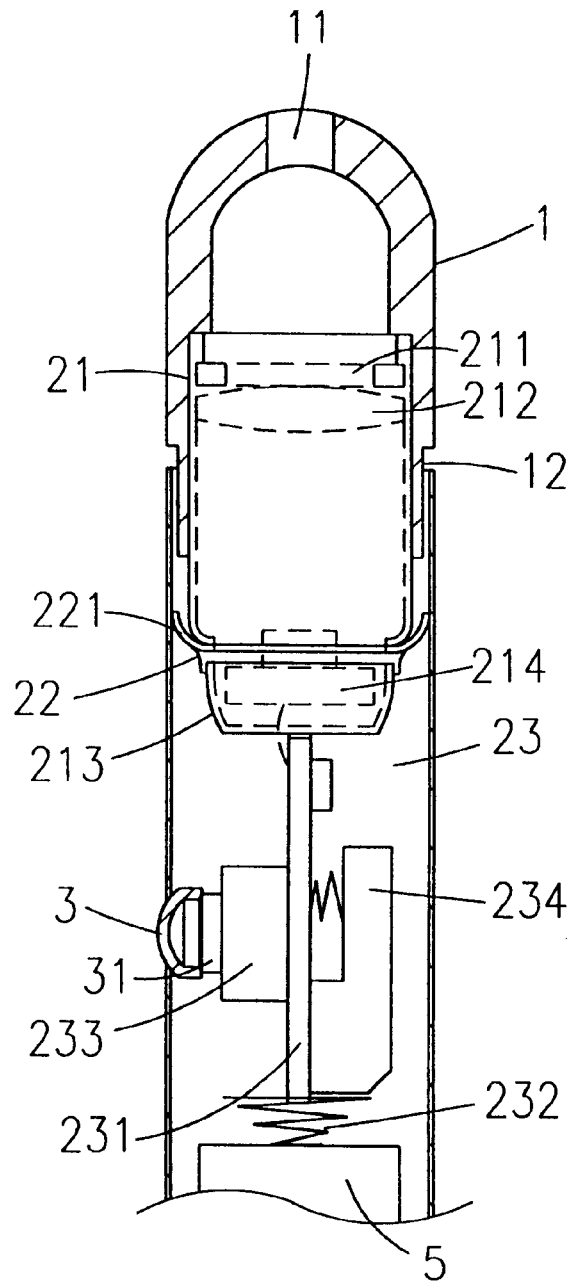
FIG. 4 is an enlarged view of the upper part of FIG. 3.

Referring to FIG. 4 and FIGS. from 1 to 3 again, the laser module 2 is comprised of a lens holder 21, a metal contact spring plate 22, and a circuit assembly 23. The lens holder 21 comprises a center hole 211 aligned with the laser firing hole 11 on the front cap 1, a lens 212 aligned with the center hole 211 and the laser firing hole 11, and a locating frame 213 fastened to the circuit assembly 23. The circuit assembly 23 comprises a circuit board 231, a metal spring 232 having one end fixedly connected to the negative terminal of the circuit board 231 and an opposite end stopped at the negative terminal of the series of battery cells 5, a switch 233 mounted on the circuit board 231 corresponding to the side hole 42 on the metal barrel 4 and connected between the positive terminal and negative terminal of the circuit board 231, a laser diode 214 mounted on the locating frame 213 of the lens holder 21 and connected to the positive and negative terminals of the circuit board 231 through the switch 233, and an electrically insulative plate 234 fastened to one side namely the back side of the circuit board 231 (opposite to the switch 233) to prevent a direct contact between the circuit board 231 and the metal barrel 4. The metal contact spring plate 22 is mounted on the locating frame 213 of the lens holder 21 around the laser diode 214 and connected to the positive terminal of the circuit board 231, having a plurality of radial projecting portions 221 equiangularly spaced around the border. When the laser module 2 is inserted into the longitudinal center through hole 41 of the metal barrel 4, the projecting portions 221 of the metal contact spring plate 2 are deformed and pressed against the inside wall of the metal barrel 4 to hold down the laser module 2 in the metal barrel 4. The button 3 is mounted in the side hole 42 on the metal barrel 4, and supported on a rubber cushion 31, which has one side adhered to the button 3 and an opposite side adhered to the laser module 2 around the switch 233. When the button 3 is pressed on, the circuit of the switch 233 is closed to transmit battery power supply from the battery cells 5 to the laser diode 214, causing it to emit a laser beam. On the contrary, when the button 3 is pressed off, the switch 233 is off, and the laser diode 214 does no work. Furthermore, because the electrically insulative cushion ring 6 is retained between the metal bottom cap 7 and the battery cells 5, the battery cells 5 and the metal bottom cap 7 are electrically disconnected if the battery cells 5 are reversely installed.

While only one embodiment of the present invention has been shown and described, it will be understood that various modifications and changes could be made thereunto without departing from the spirit and scope of the invention disclosed.

What the invention claimed is:

1. A pen-base laser pointer comprising a metal barrel having a front end, a side hole and a rear end, a laser firing cap fastened to the front end of said metal barrel and defining a laser firing hole, a metal bottom cap fastened to the bottom end of said metal barrel, a battery set mounted inside said metal barrel, said battery set having a positive terminal connected to said metal bottom cap and a negative terminal, a laser module mounted inside said metal barrel and holding a lens holder and a laser diode circuit assembly, said lens holder holding a lens aligned between said laser firing hole and said laser diode circuit assembly, and an on/off button mounted in said side hole of said metal barrel and controlled to switch on/off said laser diode circuit assembly, causing said laser diode circuit assembly to emit or stop from emitting a laser beam, wherein said laser diode circuit assembly comprises a metal spiral spring at one end disposed in contact with the negative terminal of said battery set, a metal contact spring plate at an opposite end disposed in contact with the inside wall of said metal barrel, a switch connected between said metal spiral spring and said metal contact spring plate and controlled by said on/off button to close/open the circuit, and a laser diode connected to said metal spiral spring and said metal contact spring plate through said switch, said metal contact spring plate comprising a plurality of radial projecting portions equiangularly spaced around the border thereof, which are deformed and pressed against the inside wall of said metal barrel to hold down said laser module in place when said laser module is inserted into said metal barrel.

2. The pen-base laser pointer of claim 1 wherein said on/off button is fixedly supported on a rubber cushion adhered to said laser module, and partially projecting out of the side hole on said metal barrel.

3. the pen-base laser pointer of claim 1 further comprising an electrically insulative cushion ring supported between said battery cell and said metal bottom cap around the positive terminal of said battery cell.

* * * * *